United States Patent
Huang et al.

(10) Patent No.: US 7,212,315 B2
(45) Date of Patent: May 1, 2007

(54) MIXED SCREEN DESIGN FOR MULTI-MODE DOCUMENT

(75) Inventors: Jincheng Huang, Mountain View, CA (US); Joseph Shu, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 950 days.

(21) Appl. No.: 10/244,232

(22) Filed: Sep. 16, 2002

(65) Prior Publication Data

US 2004/0051907 A1    Mar. 18, 2004

(51) Int. Cl.
*H04N 1/405* (2006.01)
(52) U.S. Cl. .................... 358/3.13; 358/3.06
(58) Field of Classification Search ............. 358/1.9, 358/2.1, 3.06–3.08, 3.13–3.2
See application file for complete search history.

(56) References Cited

U.S. PATENT DOCUMENTS

| | | | |
|---|---|---|---|
| 5,166,809 A | 11/1992 | Surbrook | |
| 5,689,586 A | 11/1997 | Lin | |
| 5,892,588 A | 4/1999 | Samworth | |
| 6,118,935 A | 9/2000 | Samworth | |
| 6,141,121 A | 10/2000 | Chen et al. | |
| 6,178,011 B1 | 1/2001 | Lin et al. | |
| 6,288,795 B1 | 9/2001 | Urasawa | |
| 2005/0264834 A1* | 12/2005 | Asai et al. | 358/1.9 |

FOREIGN PATENT DOCUMENTS

EP    0 710 006 B1    5/1996

\* cited by examiner

*Primary Examiner*—Thomas D. Lee
*Assistant Examiner*—Stephen Brinich

(57) ABSTRACT

A superpattern generator uses a first halftone pattern representing a first gray level and a second halftone pattern representing a second gray level to generate a larger pattern or "superpattern". In a preferred implementation, the superpattern generator generates a grid of elements to be used as a template for the superpattern, calculates a distance value representing the "distance" from the first gray level to a desired gray level $T_X$, determines how many elements of the grid represent the first halftone pattern and how many represent the second halftone pattern based on the distance value, superimposes a dither matrix on the grid and assigns values representing the first halftone pattern or the second halftone pattern to pixels within the elements of the grid by examining threshold values in the dither matrix. This process is repeated for various values of $T_X$ to generate a set of superpatterns representing a set of gray levels intermediate to the first gray level and the second gray level.

16 Claims, 6 Drawing Sheets

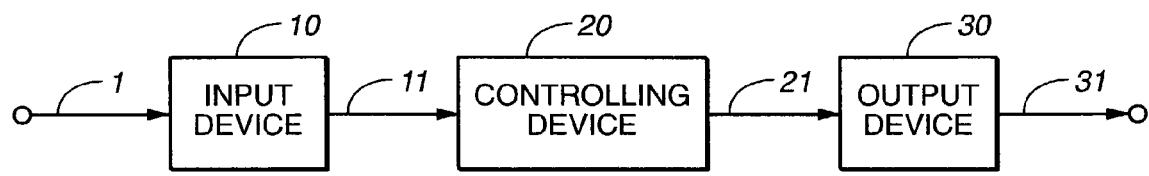
FIG._1
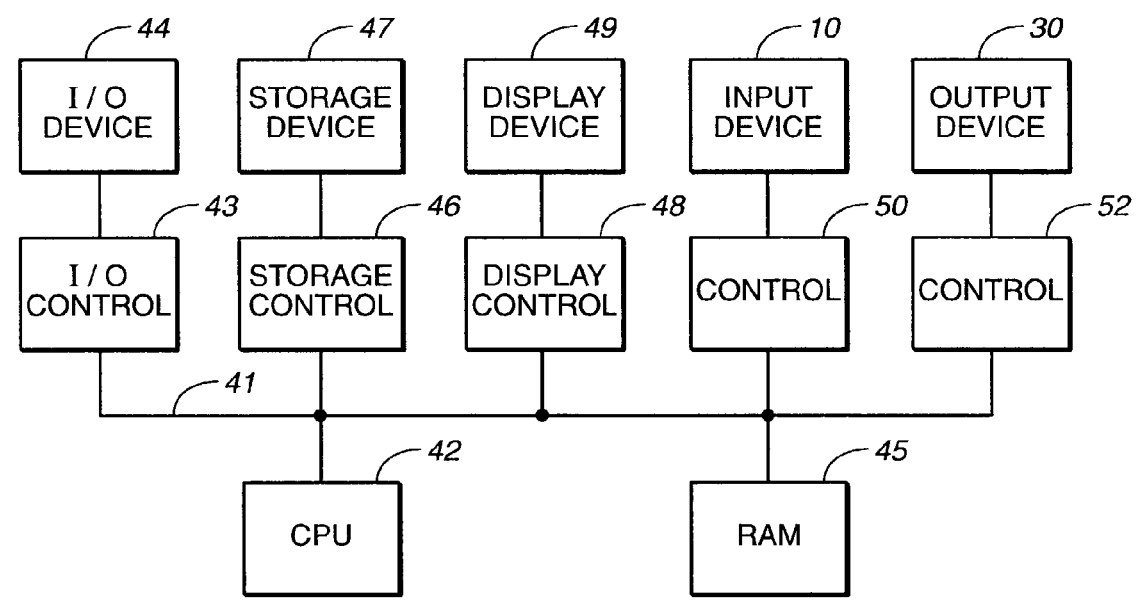
FIG._2

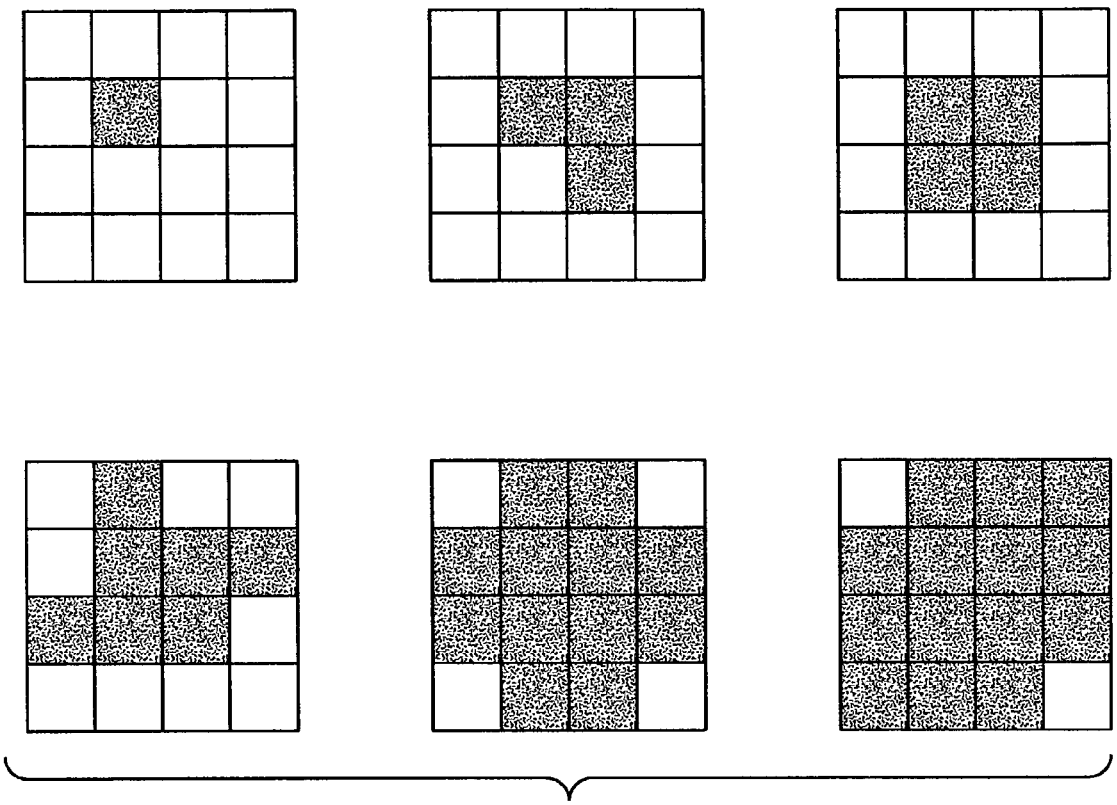
FIG._3
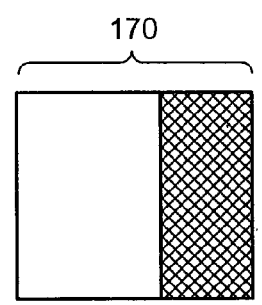
FIG._4A
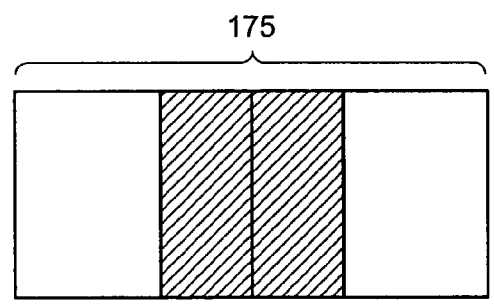
FIG._4B

FIG._5
FIG._12

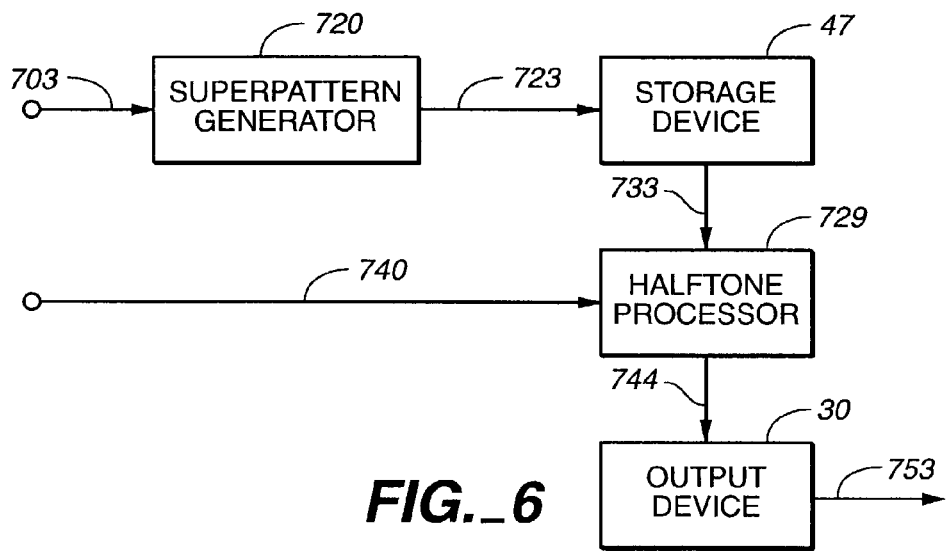
FIG._6
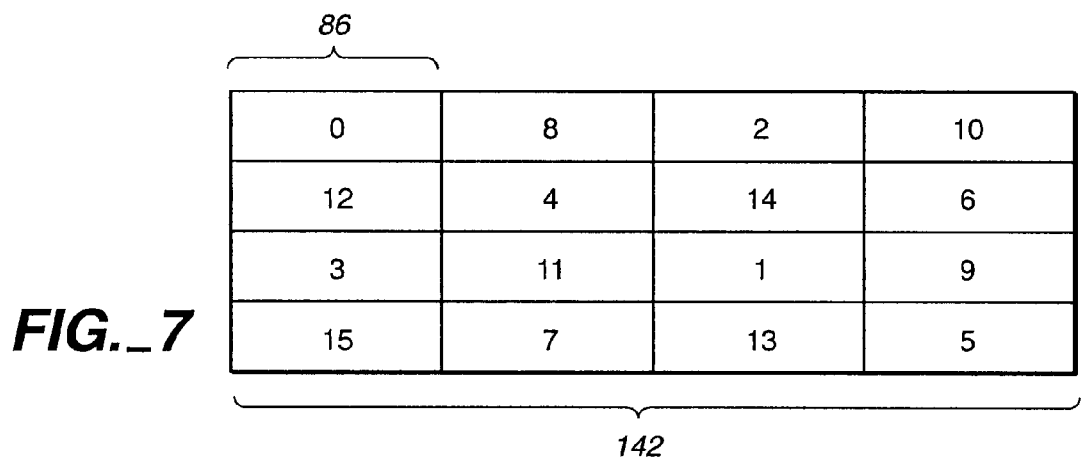
FIG._7
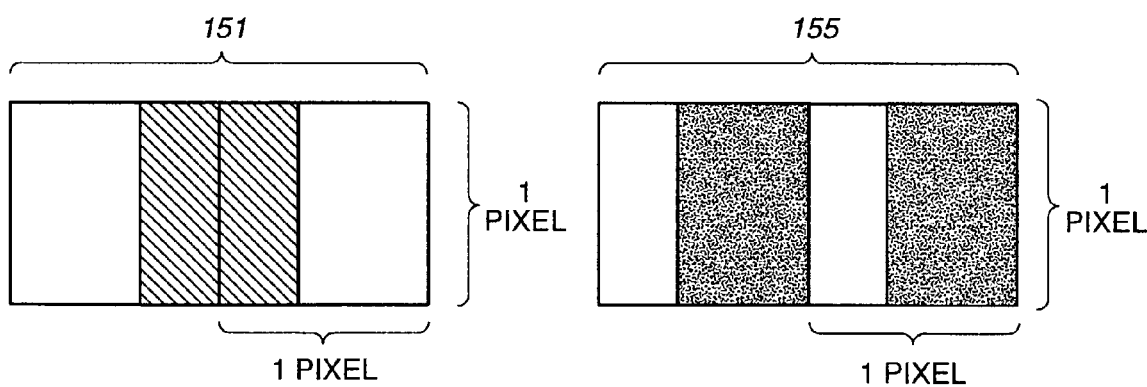
FIG._8A   FIG._8B

124
| P1 | P2 | P3 | P4 | P5 | P6 | P7 | P8 |
|----|----|----|----|----|----|----|----|
| P9 | P10 | P11 | P12 | P13 | P14 | P15 | P16 |
| P17 | P18 | P19 | P20 | P21 | P22 | P23 | P24 |
| P25 | P26 | P27 | P28 | P29 | P30 | P31 | P32 |
147
FIG._9
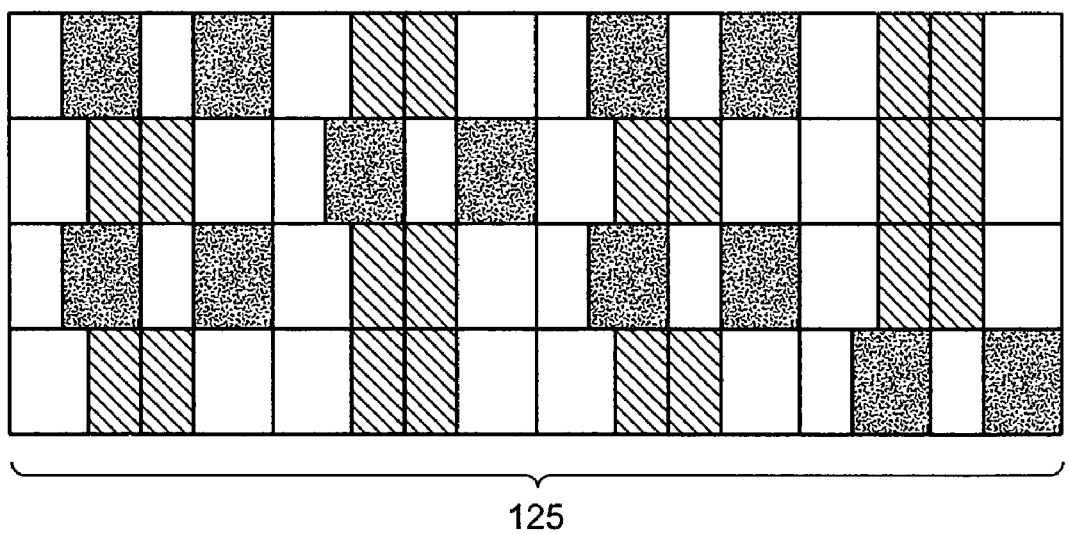
125
FIG._10

MIXED SCREEN DESIGN FOR MULTI-MODE DOCUMENT

TECHNICAL FIELD

The invention relates to the processing of image data for the purpose of enhancing the appearance of an image as presented by a device such as a printer or display.

BACKGROUND ART

Halftoning is a technique commonly used to convert a rasterized image into an output image. Halftoning techniques address certain limitations of binary printing devices, which operate by turning a pixel "on" or "off" without the capability of depicting intermediate intensity or "gray" levels. Halftoning techniques make it possible for such devices to depict multiple gray levels by representing features in a printed image using patterns of small dots. If the human eye views a pattern of sufficiently small dots, the viewer generally does not perceive the individual dots but instead perceives the average gray level of the pattern. Halftoning techniques accordingly depict different regions within an image by using different patterns of small dots chosen to have an appropriate average gray level. A binary printing device typically generates patterns of dots by selecting an array of pixels, referred to as a halftone "screen", and selectively turning the pixels within the screen on or off to produce a variety of patterns. A pattern generated in this way is referred to herein as a "halftone pattern". Each halftone pattern corresponds to and is used to represent a particular gray level. The number of gray levels that can be rendered by a given halftone screen is limited by the number of pixels in the screen. On a binary printing device, an N-by-N halftone screen can depict $N^2+1$ different gray levels. The average gray level represented by a particular halftone pattern is commonly referred to simply as the gray level of the halftone pattern.

The desired gray level is not the only factor considered in selecting a halftone pattern or a halftone screen. The halftone pattern or the size of the halftone screen may also be adjusted within an image to optimize image resolution, to minimize artifacts, or for other reasons. Where a printing system produces an image containing several regions representing different "modes", i.e., photo, text and/or graphics, it may be preferable to vary the size of the halftone screen within the image based on the desired degree of spatial resolution in each region. The degree of spatial resolution provided by a halftone screen is determined by its "screen frequency". Typically, a smaller halftone screen has a higher screen frequency. Subpixels generated by applying pulse-width modulation techniques can be used to create halftone screens as small as one pixel in size.

To render text or line art, it is often preferable to use a high-frequency screen having a high spatial resolution to avoid the appearance of artifacts such as jagged edges in the printed image; however, the use of a high-frequency screen tends to limit the number of gray levels that can be generated. Photographic images, in contrast, tend to contain many gray levels but require lower spatial resolution than is needed for text images. Consequently, a lower-frequency screen which permits the rendition of a greater number of gray levels, but offers lower spatial resolution, may be preferable for a region of an image containing a photographic image.

The use of different halftone patterns, or the use of multiple halftone screens of different sizes within a halftoned image can cause some printing devices to produce defects in regions of the printed image where more than one halftone screen or pattern are used. Some defects are printer-dependent and in many cases their appearance is unpredictable. Common techniques that apply different halftone patterns having the same screen frequency to render multiple gray levels generally produce a smooth transition in gray level from darker to lighter regions; however, in some printing devices a defect known as a "discontinuity" may appear in which an abrupt change from one gray level to another is visible within the transition region. Another technique uses halftone patterns generated using a high-frequency halftone screen to render a darker region but selects a lower-frequency halftone screen to render a lighter region. If the high-frequency and low-frequency halftone screens are carefully chosen, this technique produces a smooth transition from the darker region to the lighter region; however, in some printing devices a defect known as a "divergence" may appear in which the printing device fails to depict accurately the gray level of one or more halftone patterns in the transition region, and the shift from one screen frequency to another is visible.

An additional problem associated with some high-frequency halftone screens is instability. Printing devices that use electric charges in the printing process, including many toner-transfer printing devices, sometimes fail to print very small, isolated dots and therefore may fail to print one or more dots within a halftone pattern. A halftone screen that displays such behavior is referred to as being unstable. Instability represents an obstacle to achieving fine control over the gray level in a printed image, and can be especially problematic when a high-frequency halftone screen is used to depict lighter regions in an image. One solution commonly used is to select a relatively stable, lower-frequency halftone screen to render lighter regions; however, if such a selection necessitates a transition from a high-frequency to a low-frequency halftone screen, a divergence may appear within the printed image. There is a need to overcome the problems outlined above and to develop a technique permitting the use of different halftone screens and halftone patterns to achieve consistent and accurate rendition of multiple gray levels and of transitions between gray levels in a printed image while minimizing the occurrence of defects.

DISCLOSURE OF INVENTION

It is an object of the present invention to depict smoothly a plurality of gray levels using different halftone screens and halftone patterns by combining elements of a first halftone pattern representing a first gray level and a second halftone pattern representing a second gray level to generate a set of blended halftone patterns, while minimizing the appearance of defects.

A superpattern generator uses the first and second halftone patterns to generate a larger pattern or "superpattern". In a preferred implementation, the superpattern generator generates a grid of elements to be used as a template for a superpattern, calculates a distance value representing the "distance" from the first gray level to desired gray level $T_X$, determines how many elements of the grid represent the first halftone pattern and how many represent the second halftone pattern based on the distance value, superimposes a dither matrix on the grid and assigns values representing the first halftone pattern or the second halftone pattern to pixels within the elements of the grid by examining threshold values in the dither matrix. This process is repeated for various values of $T_X$ to generate a set of superpatterns representing a set of gray levels intermediate to the first gray level and the second gray level.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 1 illustrates major components in a typical image reproduction system.

FIG. 2 illustrates major components in a typical personal computer system that may be used to carry out various aspects of the invention.

FIG. 3 illustrates several patterns generated using a halftone screen made up of sixteen pixels.

FIG. 4(a) shows a halftone pattern consisting of a single pixel.

FIG. 4(b) shows a halftone pattern consisting of two pixels.

FIG. 5 shows a spectrum of gray levels generated using different halftone screens.

FIG. 6 is a block diagram of a system that may be used to carry out various aspects of the invention.

FIG. 7 is a schematic representation of a 4-by-4 dispersed dot matrix.

FIGS. 8(a) and 8(b) show two 2-by-1 halftone patterns that may be used to generate a superpattern.

FIG. 9 is a schematic illustration of a 4-by-4 grid of elements used by the superpattern generator to generate a superpattern.

FIG. 10 is a schematic illustration of a superpattern.

FIG. 12 shows a spectrum of gray levels generated using a set of superpatterns.

MODES FOR CARRYING OUT THE INVENTION

System Overview

Figure 11:
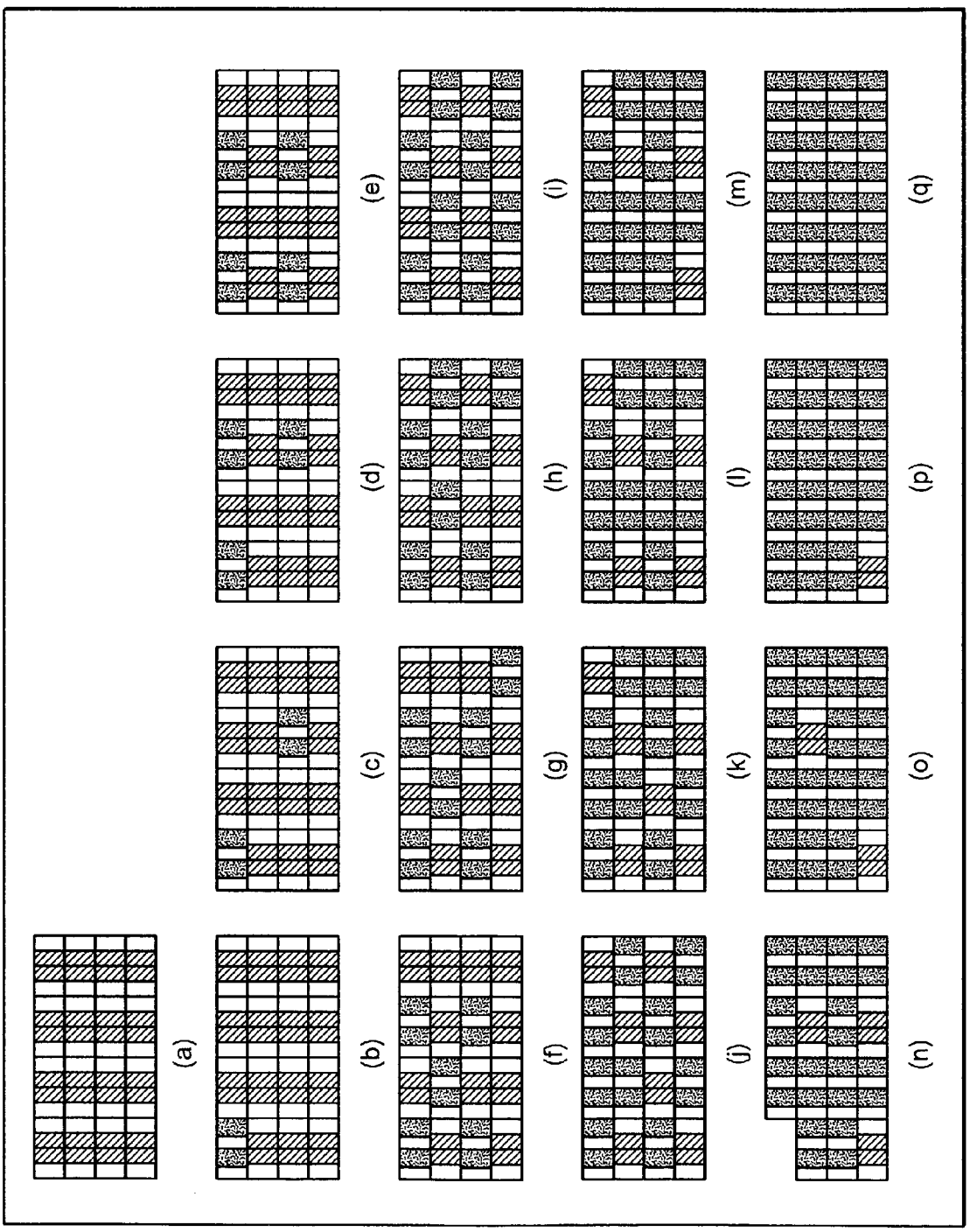
FIG. 11 is a schematic illustration of seventeen superpatterns generated using the 4-by-4 dispersed dot matrix shown in FIG. 8.

FIG. 1 illustrates major components in a typical image reproduction system. Input device 10 receives from path 1 signals representing an original image and generates along path 11 a rasterized representation of the original image. Controlling device 20 receives this representation from path 11 and, in response, generates along path 21 an output-device-dependent representation of the original image. Output device 30 receives this representation from path 21 and, in response, generates along path 31 a printed representation of the original image. The present invention is directed toward improving the perceived quality of the printed representation produced by the output device.

Input device 10 may be a software application capable of generating text or graphics images or image data representing a photographic image. Alternatively, input device 10 may be an apparatus such as a scanner or camera. If input device 10 is a software application for creating images, the signals received from path 1 could represent commands or data for the application.

Output device 30 may be any type of printing device that is capable of generating a rasterized output image. If output device 30 is a printer, for example, the printed image generated along path 31 could be the printed image on paper.

Controlling device 20 is responsible for transforming the rasterized representation of the original image received from path 11 into an output-device-dependent representation of the original image. Controlling device 20 may be implemented by software and/or hardware in a general-purpose computer such as that illustrated in FIG. 2. FIG. 2 illustrates major components in a typical personal computer system that may be used to carry out various aspects of the invention. CPU 42 provides computing resources. I/O control 43 represents an interface to I/O device 44 such as a keyboard, mouse or modem. RAM 45 is system random access memory. Storage control 46 represents an interface to storage device 47 that includes a storage medium such as magnetic tape or disk, or an optical medium. The storage medium may be used to record programs of instructions for operating systems, utilities and applications, and may include programs that implement various aspects of the present invention. Display control 48 provides an interface to display device 49. Display device may be any type of visual display device. Control 50 represents an interface to input device 10 such as a software application capable of generating text or graphics images, or a scanner. Control 52 represents an interface to output device 30 such as a laser printer. Although the following discussion contemplates implementation of the invention in a printing device such as a laser printer or ink-jet printer, the invention may be implemented as well within a visual display device such as a computer monitor.

In FIG. 2, all major system components connect to bus 41, which may represent more than one physical bus. A bus architecture is not required to practice the present invention.

The functions of one or more computer components as well as various aspects of the present invention can be implemented in a wide variety of circuitry including discrete logic components, one or more ASICs and/or program-controlled processors. For example, controlling device 20 may be implemented by a special-purpose device. The manner in which controlling device 20 is implemented is not important to the present invention. Other implementations including digital and analog processing circuitry may be used.

Halftoning and Halftone Screens

Halftoning techniques are used to depict various gray levels within a printed image by using patterns of small dots. These halftone patterns are generated by selecting an array of pixels, commonly referred to as a halftone screen, and selectively turning the pixels within the screen on or off to produce a variety of patterns. FIG. 3 illustrates several halftone patterns generated using a halftone screen made up of sixteen pixels. On a binary printing device, the number of gray levels that can be rendered by a given halftone screen is limited by the number of pixels in the screen. A N-by-N halftone screen can depict $N^2+1$ different gray levels.

The desired gray level is not the only factor considered in selecting a halftone pattern or a halftone screen. As discussed above, where a printing device generates an image containing different "modes", i.e., photo, text and/or graphics, it is often preferable to adjust the halftone screen size based on additional considerations such as the desired degree of spatial resolution. By using pulse-width modulation techniques, it is possible to vary the width and location of subpixels within a single pixel and create a halftone screen as small as one pixel in size. FIG. 4(a) shows a halftone screen 170 consisting of a single pixel. FIG. 4(b) shows a halftone screen 175 consisting of two pixels.

The use of different halftone screens or halftone patterns within a halftoned image can cause some printing devices to fail to depict accurately the gray level of one or more halftone patterns, producing defects such as discontinuities and divergences in the printed image. FIG. 5 shows a spectrum of gray levels generated by a printing device using different halftone screens. The darker region covering roughly the left-half of the image is rendered using a high-frequency 1-by-1 halftone screen similar to the 1-by-1 halftone screen 170 shown in FIG. 4(a), in which the width of the subpixel decreases monotonically from left to right. Because high-frequency halftone screens sometimes exhibit instability when used to depict lighter regions, a lower-frequency 2-by-1 halftone screen similar to the 2-by-1 halftone screen 175 shown in FIG. 4(b) is used to render the lighter region on the right side of the image. A divergence 670 is visible at the transition between the 1-by-1 halftone screen and the 2-by-1 halftone screen.

The present invention offers a technique to depict smoothly a plurality of gray levels using superpatterns that are generated by combining elements of a first halftone pattern representing a first gray level and a second halftone pattern representing a second gray level. The superpatterns are used to generate multiple gray levels within a printed image while minimizing the appearance of defects.

Superpattern Generator

FIG. 6 is a block diagram of a system that may be used to carry out various aspects of the invention. A superpattern generator 720 receives data from path 703. The superpattern generator 720 transmits data along path 723 to a storage device 47. The halftone processor 729 receives rasterized image data along path 740, accesses data stored in the storage device 47 and transmits along path 744 to output device 30 a halftoned representation of the image. The output device 30 generates a printed image along path 753. In a preferred implementation, the superpattern generator 720 is implemented by a software application. In this implementation, the superpattern generator 720, the storage device 47, the halftone processor 729 and the output device 30 are incorporated in a general-purpose computer system such as a personal computer. Alternatively, the superpattern generator 720 is implemented by digital or analog circuitry incorporated within a general-purpose or special-purpose computer system. In another implementation, the superpattern generator 720 is incorporated within an output device. In this implementation, the superpattern generator 720 may be implemented by a software application executable by the printing device or by digital or analog circuitry. In yet another implementation, the superpattern generator 720 is incorporated in a general-purpose or a special-purpose computer system and the storage device 47 and halftone processor are incorporated within a separate output device.

The superpattern generator 720 uses a first halftone pattern representing a first gray level and a second halftone pattern representing a second gray level to generate a set of larger patterns or "superpatterns". Each superpattern represents a gray level that is intermediate to the first and second gray levels and determined by the particular arrangement of the first and second halftone patterns within the superpattern. In the preferred implementation, the superpattern generator 720 generates the superpatterns offline and transmits data representing the superpatterns along path 723 to the storage device 47. The data representing the superpatterns are stored by the storage device 47. Subsequently, the halftone processor 729 accesses and utilizes the superpattern data to generate halftone data. In one implementation, the halftone processor 729 uses the superpattern data to expand the number of halftone patterns available for representing gray levels between the first and second gray levels. The output device 30 uses the halftone data to render a plurality of gray levels, and generates a printed image along path 753. The halftone process may occur prior to or concurrently with, the printing operation. Alternatively, the data representing the superpatterns may be transmitted directly to the halftone processor, without being stored, for immediate use in connection with a printing operation.

In one implementation, the superpattern generator 720 receives from path 703: (1) data defining a first halftone pattern, referred to hereinafter as "Pattern A", and data indicating the gray level $T_A$ of Pattern A, (2) data defining a second halftone pattern, referred to hereinafter as "Pattern B", and data indicating the gray level $T_B$ of Pattern B, (3) dimensions N, M of a grid made up of (N·M) elements and (4) a desired gray level $T_X$ intermediate to $T_A$ and $T_B$ for the superpattern. Pattern A and Pattern B must have the same screen size. For example, if Pattern A is a 2-by-1 array of pixels then Pattern B must also be a 2-by-1 array of pixels. The dimensions of Pattern A and Pattern B will hereinafter be referred to as the "Pattern Size". It is possible to create a superpattern starting with two halftone patterns of different screen sizes; however, in such case it is necessary first to replicate one or both of the halftone patterns to create a larger pattern. For example, a 1-by-1 halftone pattern may be replicated to create a 2-by-1 halftone pattern and then combined with a different 2-by-1 halftone pattern to generate a superpattern. The dimensions N and M of the grid are typically determined based on the number of gray levels desired. A grid of dimensions N-by-M can represent up to (N·M)+1 different gray levels. A larger grid allows more gray levels and therefore finer gradations between $T_A$ and $T_B$. While the dimensions N-by-M refer to the number of elements within the grid, the number of pixels within the grid may be greater than N·M. This distinction is discussed in greater detail below.

In a preferred implementation, the superpattern generator 720 generates a N-by-M grid as a template for a superpattern. Each element of the grid comprises an array of pixels of the same dimensions as the Pattern Size, and therefore may comprise multiple pixels. For example, if the Pattern Size is 2-by-1, each element of the grid comprises a 2-by-1 array of pixels. To generate a superpattern representing gray level $T_X$, the superpattern generator 720 calculates a normalized distance value $\Delta$ representing the "distance" from gray level $T_A$ to desired gray level $T_X$. The normalized distance $\Delta$ from $T_A$ to $T_X$ is determined according to the following formula:

$$\Delta = \frac{T_X - T_A}{T_B - T_A} \quad (1)$$

In this implementation, $n_A$ elements of the grid represent Pattern A and $n_B$ elements of the grid represent Pattern B, where:

$$n_A = \text{round}((1-\Delta) \cdot (N \cdot M)) \quad (2)$$

$$n_B = (N \cdot M) - n_A \quad (3)$$

In equation (2), the function round(x) generates the integer value nearest to the argument x.

A dither matrix, such as a dispersed dot matrix or a clustered dot matrix, may be used to determine the values of pixels within each element of the grid and thereby generate a superpattern. The superpattern generator 720 superimposes the dither matrix on the grid and assigns values representing Pattern A and Pattern B to pixels in the grid based on threshold values in the dither matrix. In this implementation, the superpattern generator 720 superimposes a dispersed dot matrix on the grid to generate the superpattern. FIG. 7 is a schematic representation of a 4-by-4 dispersed dot matrix 142. Each integer value between 0 and 15 inclusive is assigned as a threshold value to one of the elements in the 4-by-4 dispersed dot matrix 142. Each threshold value between 0 and 15 appears once in the dispersed dot matrix 142.

In this implementation, the superpattern generator 720 determines values for pixels in the grid by examining threshold values in the dispersed dot matrix 142. If a threshold value is less than $n_B$, the superpattern generator 720 assigns values representing Pattern B to the pixels in the corresponding element of the grid. If the threshold value is equal to or greater than $n_B$, the superpattern generator 720 assigns values representing Pattern A to the pixels in the corresponding element of the grid.

FIGS. 8(*a*) and 8(*b*) show two 2-by-1 halftone patterns 151, 155 that may be used to generate a superpattern. For purposes of this discussion the halftone pattern 151 shown in FIG. 8(*a*) will be referred to as Pattern A and the halftone pattern 155 shown in FIG. 8(*b*) will be referred to as Pattern B. The Pattern Size is 2-by-1. If Pattern A represents a gray level $T_A$ equal to 60 and Pattern B represents a gray level $T_B$ equal to 100, and a 4-by-4 superpattern is intended to represent a gray level $T_X$=75, the superpattern generator can create a 4-by-4 grid as shown in FIG. 9. Referring to FIG. 9, each element in the grid 147 comprises a 2-by-1 array of pixels. For example, the element 124 comprises pixels P1 and P2. The superpattern generator 720 determines the normalized distance $\Delta$ to be equal to:

$$\Delta = \frac{T_X - T_A}{T_B - T_A} = \frac{75 - 60}{100 - 60} = 0.38 \quad (4)$$

Therefore, $$n_A = \text{round}((1-\Delta)\cdot(N\cdot M)) = \text{round}((1-0.38)\cdot 16) = \text{round}(9.92) = 10, \quad (5)$$

$$n_B = (N\cdot M) - n_A = 16 - 10 = 6 \quad (6)$$

The superpattern generator 720 compares the value $n_B$ with each threshold value in the dispersed dot matrix 142 to determine whether the corresponding element of the grid 147 represents Pattern A or Pattern B. If a threshold value in the dispersed dot matrix 142 is less than the value of $n_B$, the superpattern generator 720 assigns to the pixels in the corresponding element of the grid 147 values representing Pattern B. If a threshold value in the dispersed dot matrix 142 is equal to or greater than the value of $n_B$, the superpattern generator 720 assigns values representing Pattern A to the pixels in the corresponding element of the grid 147. Referring to FIG. 7, the threshold value for element 86 of the dispersed dot matrix 142 is zero, which is less than $n_B$. The superpattern generator 720 assigns to pixels P1 and P2 in the element 124 of the grid 147 values representing Pattern B. This determination is repeated for all elements in the grid 147. The resulting superpattern 125 is shown in FIG. 10.

Utilizing the 4-by-4 dispersed dot matrix 142 shown in FIG. 7, a set of superpatterns representing (N·M)+1 gray levels is generated. FIG. 11 illustrates seventeen superpatterns generated using Pattern A, Pattern B and the 4-by-4 dispersed dot matrix 142. FIG. 12 shows a spectrum of gray levels generated using a set of superpatterns. Discontinuities and divergences have been eliminated.

What is claimed is:

1. A method for generating a superpattern made up of a composition of elements, wherein the method comprises:
   receiving data that defines a first halftone pattern representing a first gray level and a second halftone pattern representing a second gray level;
   constructing the composition of elements having a first quantity of elements representing the first halftone pattern and a second quantity of elements representing the second halftone pattern, wherein the first quantity and the second quantity are determined based on a distance value representing a distance from the first gray level to a desired gray level, wherein the desired gray level is intermediate to the first gray level and the second gray level; and
   transmitting or storing data representing the superpattern for use in presentation of an image.

2. The method of claim 1 wherein the composition of elements comprises a grid of pixels.

3. The method of claim 1 that arranges the elements within the composition by examining threshold values in a dither matrix.

4. The method of claim 1 wherein the distance value represents a distance from the first gray level to the desired gray level normalized with respect to a distance between the first gray level and the second gray level.

5. An apparatus comprising a memory and processing circuitry coupled to the memory wherein the processing circuitry:
   receives data that defines a first halftone pattern representing a first gray level and a second halftone pattern representing a second gray level;
   generates a superpattern by constructing a composition of elements having a first quantity of elements representing the first halftone pattern and a second quantity of elements representing the second halftone pattern, wherein the first quantity and the second quantity are determined based on a distance value representing a distance from the first gray level to a desired gray level, wherein the desired gray level is intermediate to the first gray level and the second gray level; and
   stores data representing the superpattern in the memory for use in presentation of an image.

6. The apparatus of claim 5 wherein the composition of elements comprises a grid of pixels.

7. The apparatus of claim 5 wherein the processing circuitry arranges the elements within the composition by examining threshold values in a dither matrix.

8. The apparatus of claim 5 wherein the distance value represents a distance from the first gray level to the desired gray level normalized with respect to a distance between the first gray level and the second gray level.

9. A medium readable by a device embodying a program of instructions for execution by the device to perform a method for generating a superpattern made up of a composition of elements, wherein the method comprises:

receiving data that defines a first halftone pattern representing a first gray level and a second halftone pattern representing a second gray level;

constructing the composition of elements having a first quantity of elements representing the first halftone pattern and a second quantity of elements representing the second halftone pattern, wherein the first quantity and the second quantity are determined based on a distance value representing a distance from the first gray level to a desired gray level, wherein the desired gray level is intermediate to the first gray level and the second gray level; and transmitting or storing data representing the superscreen for use in presentation of an image.

10. The medium of claim 9 wherein the composition of elements comprises a grid of pixels.

11. The medium of claim 9 wherein the method arranges the elements within the composition by examining threshold values in a dither matrix.

12. The medium of claim 9 wherein the distance value represents a distance from the first gray level to the desired gray level normalized with respect to a distance between the first gray level and the second gray level.

13. An apparatus for generating a superpattern made up of a composition of elements, wherein the apparatus comprises:

means for receiving data that defines a first halftone pattern representing a first gray level and a second halftone pattern representing a second gray level;

means for constructing the composition of elements having a first quantity of elements representing the first halftone pattern and a second quantity of elements representing the second halftone pattern, wherein the first quantity and the second quantity are determined based on a distance value representing a distance from the first gray level to a desired gray level, wherein the desired gray level is intermediate to the first gray level and the second gray level; and means for transmitting or storing data representing the superpattern for use in presentation of an image.

14. The apparatus of claim 13 wherein the composition of elements comprises a grid of pixels.

15. The apparatus of claim 13 that arranges the elements within the composition by examining threshold values in a dither matrix.

16. The apparatus of claim 13 wherein the distance value represents a distance from the first gray level to the desired gray level normalized with respect to a distance between the first gray level and the second gray level.

* * * * *